(12) United States Patent
Chelba et al.

(10) Patent No.: US 7,788,096 B2
(45) Date of Patent: Aug. 31, 2010

(54) METHOD AND APPARATUS FOR GENERATING DECISION TREE QUESTIONS FOR SPEECH PROCESSING

(75) Inventors: Ciprian I. Chelba, Seattle, WA (US); Rachel I. Morton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1214 days.

(21) Appl. No.: 10/233,733

(22) Filed: Sep. 3, 2002

(65) Prior Publication Data

US 2004/0044528 A1     Mar. 4, 2004

(51) Int. Cl.
G10L 15/04     (2006.01)

(52) U.S. Cl. ..................................... 704/254

(58) Field of Classification Search ......... 704/221–225, 704/251–254
See application file for complete search history.

(56) References Cited

U.S. PATENT DOCUMENTS

| | | | | |
|---|---|---|---|---|
| 5,715,367 A | * | 2/1998 | Gillick et al. ............... | 704/254 |
| 5,745,649 A | * | 4/1998 | Lubensky .................... | 704/232 |
| 5,794,197 A | * | 8/1998 | Alleva et al. ................. | 704/255 |
| 6,058,205 A | | 5/2000 | Bahl et al. ................... | 382/159 |
| 6,151,575 A | * | 11/2000 | Newman et al. ............ | 704/260 |
| 6,253,169 B1 | | 6/2001 | Apte et al. ..................... | 704/9 |
| 6,317,712 B1 | * | 11/2001 | Kao et al. ................ | 704/256.3 |
| 6,351,561 B1 | | 2/2002 | Iyengar ....................... | 382/226 |
| 6,567,797 B1 | * | 5/2003 | Schuetze et al. ................ | 707/2 |
| 6,964,023 B2 | * | 11/2005 | Maes et al. .................. | 715/811 |

FOREIGN PATENT DOCUMENTS

| | | |
|---|---|---|
| EP | 0 313 975 B1 | 12/1994 |
| JP | 9-34486 | 2/1997 |
| JP | 10-508392 | 8/1998 |
| JP | 11-259089 | 9/1999 |
| JP | 2000-509836 | 8/2000 |
| JP | 2001-100779 | 4/2001 |
| JP | 2001-195084 | 7/2001 |

OTHER PUBLICATIONS

Kuhn R et al: "Improved decision trees for phonetic modeling" ICASSP-95, Detroit, MI, USA, vol. 1, May 9, 1995, pp. 552-555, XP010625292 ISBN: 0-7803-2431-5.*

Malcolm A. Gleser and Morris F. Collen, "Towards Automated Medical Decisions," Computers and Biomedical Research, 5(2):180-189 (Apr. 1972).

Ishwar Krishnan Sethi and G.P.R. Sarvarayudu, "Heirarchical Classifier Design Using Mutual Information," IEEE Transactions on Pattern Analysis and Machine Intelligence, PAMI-4(4):441-445 (Jul. 1982).

(Continued)

*Primary Examiner*—Michael N Opsasnick
(74) *Attorney, Agent, or Firm*—Theodore M. Magee; Westman, Champlin & Kelly, P.A.

(57) ABSTRACT

The present invention automatically builds question sets for a decision tree. Under the invention, mutual information is used to cluster tokens, representing either phones or letters. Each cluster is formed so as to limit the loss in mutual information in a set of training data caused by the formation of the cluster. The resulting sets of clusters represent questions that can be used at the nodes of the decision tree.

19 Claims, 5 Drawing Sheets

OTHER PUBLICATIONS

Jan L. Talmon, "A Multiclass Nonparametric Partitioning Algorithm," Pattern Recognition Letters, 4:31-38 (1986).

P. Brown et al., "Class-Based N-Gram Models of Natural Language," Computational Linguistics, vol. 18, pp. 467-479 (1997).

M. Hwang et al., "Predicting Unseen Triphones With Senones," Tech. Rep. CS-93-193, School of Computer Science, Carnegie Mellon University, pp. 1-13 (Apr. 5, 1993).

L. Bahl et al., "Decision Trees for Phonological Rules in Continuous Speech," IEEE International Conference on Acoustics, Speech, and Signal Processing, pp. 185-188 (1991).

S. Young et al., "Tree-Based State Tying for High Accuracy Acoustic Modelling," Proceedings ARPA Workshop on Human Language Technology, pp. 307-312 (1994).

S. Young, "The HTK Hidden Markov Model Toolkit: Design and Philosophy," Tech. Rep. TR.153, Cambridge University Engineering Department, pp. 1-27 (Sep. 6, 1994).

Kuhn et al., "Improved Decision Trees for Phonetic Modeling," Acoustics, Speech, and Signal Processing, 1995, Detroit, MI.

Ciprian et al, Mutual Information Phone Clustering for Decision Tree Induction,: ICSLP 2002: $7^{th}$ International Conference on Spoken Language Processing, Denver, CO 2002.

European Search Report foreign application No. 03019296.7 filed Aug. 24, 2003.

May 29, 2008 European Search Report for foreign application No. 03019296.7 filed Aug. 24, 2003.

Notice of Rejection from Japanese Application No. 2003-310666 dated Dec. 18, 2009.

* cited by examiner

METHOD AND APPARATUS FOR GENERATING DECISION TREE QUESTIONS FOR SPEECH PROCESSING

BACKGROUND OF THE INVENTION

The present invention relates to decision trees. In particular, the present invention relates to automatically generating questions found in decision trees that are used in speech processing.

A decision tree is a connected set of nodes that begins at a root node and ends at one or more leaf nodes. With the exception of the leaf nodes, each node in the tree has an associated question and a set of child nodes that extend below the node. The decision tree is traversed by answering the question at a node and selecting one of the child nodes based on the answer. This question answering continues until the tree has been traversed from the root node to one of the leaf nodes.

In speech recognition, such decision trees have been used to reduce the number of acoustic models that are needed to decode speech. In particular, decision trees have been used to group triphone states together in the leaf nodes of the trees. A single phonetic model can then be provided for all of the triphones in a leaf node instead of providing a separate model for each triphone state.

Decision trees have also been used to identify pronunciations for words. In such decision trees, the leaf nodes contain alternative pronunciations for a letter in a given context and the questions in the tree determine which leaf node should be accessed for a given combination of input letters.

In the past, developing the questions used in a speech processing decision tree required detailed linguistic knowledge. For some languages, this knowledge is available from linguistic experts who craft the questions based on phonetic characteristics learned from a study of the language. However, such expert knowledge is not available for all languages and would be expensive to develop. As a result, the production of the decision tree questions represents a barrier to developing decision trees for many languages.

SUMMARY OF THE INVENTION

The present invention automatically builds question sets for a decision tree. Under the invention, mutual information is used to cluster tokens, representing either phones or letters. Each cluster is formed so as to limit the loss in mutual information in a set of training data caused by the formation of the cluster. The resulting sets of clusters represent questions that can be used at the nodes of the decision tree.

DETAILED DESCRIPTION OF ILLUSTRATIVE EMBODIMENTS

The discussion of FIG. 1 below is simply to set out but one illustrative environment in which the present invention can be used, although it can be used in other environments as well.

Figure 1:
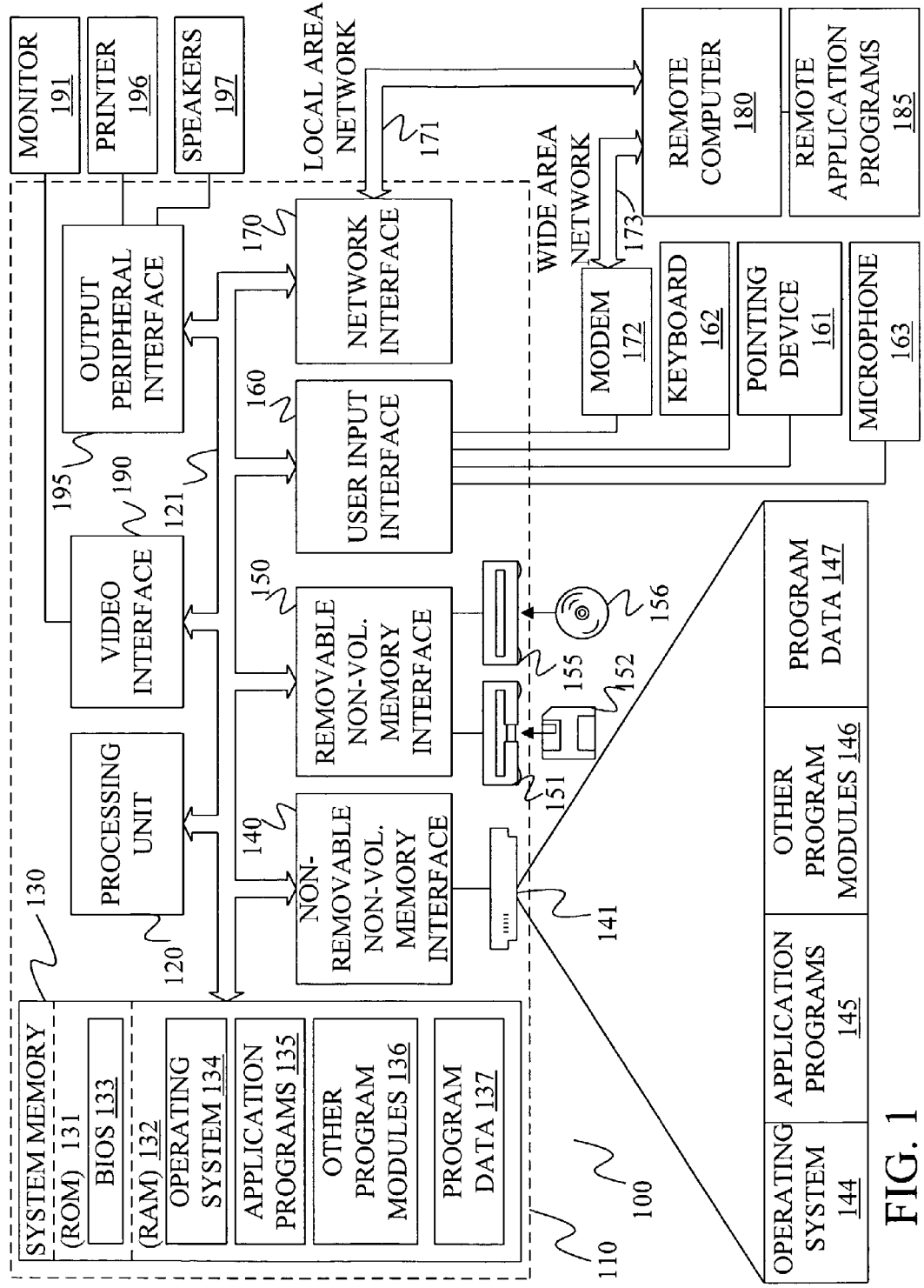
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
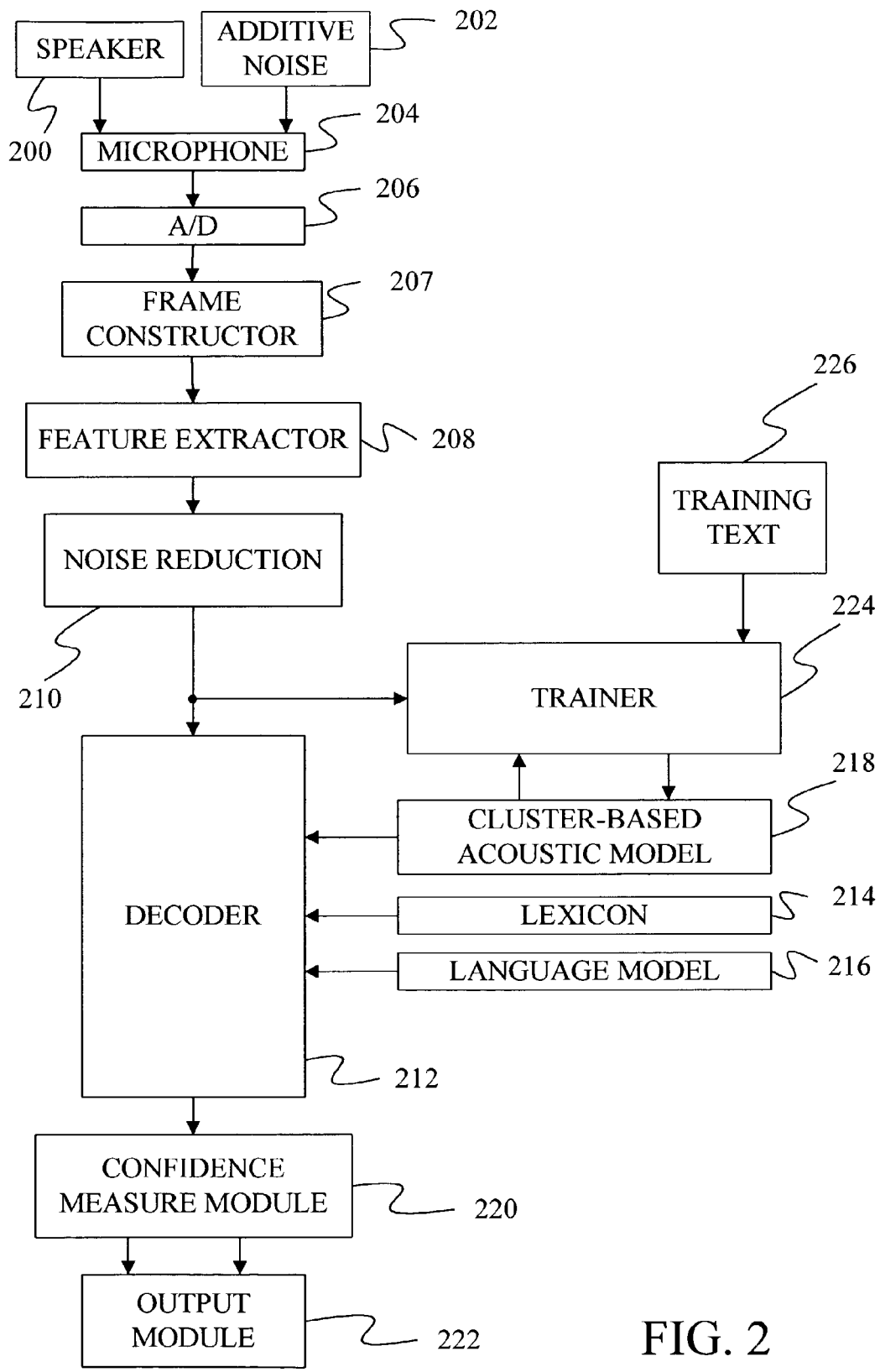
FIG. 2 is a block diagram of a speech recognition system that utilizes cluster-based acoustic models formed in part based on the present invention.

The present invention provides a method for forming questions used in speech processing decision trees. FIG. 2 provides a block diagram of a speech recognition system that includes a cluster-based acoustic model formed using a decision tree created under the present invention.

In FIG. 2, a speaker 200, either a trainer or a user, speaks into a microphone 204. Microphone 204 also receives additive noise from one or more noise sources 202. The audio signals detected by microphone 204 are converted into electrical signals that are provided to analog-to-digital converter 206.

A-to-D converter 206 converts the analog signal from microphone 204 into a series of digital values. In several embodiments, A-to-D converter 206 samples the analog signal at 16 kHz and 16 bits per sample, thereby creating 32 kilobytes of speech data per second. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extractors are well known in the art.

The feature extraction module produces a stream of feature vectors that are each associated with a frame of the speech signal. This stream of feature vectors is provided to noise reduction module 210, which reduces the noise in the input speech signal.

The output of noise reduction module 210 is a series of "clean" feature vectors. If the input signal is a training signal, this series of "clean" feature vectors is provided to a trainer 224, which uses the "clean" feature vectors and a training text 226 to train an acoustic model 218. Acoustic model 218 includes clustered context-dependent phones that are grouped using a decision tree. In particular, the decision tree used to cluster the phones includes questions formed through the present invention. Thus, feature vectors for a number of different context-dependent phones are used to train a single model for a cluster in which the phones are found.

If the input signal is a test signal, the "clean" feature vectors are provided to a decoder 212, which identifies a most likely sequence of words based on the stream of feature vectors, a lexicon 214, a language model 216, and the acoustic model 218.

The most probable sequence of hypothesis words is provided to a confidence measure module 220. Confidence measure module 220 identifies which words are most likely to have been improperly identified by the speech recognizer, based in part on a secondary acoustic model (not shown). Confidence measure module 220 then provides the sequence of hypothesis words to an output module 222 along with identifiers indicating which words may have been improperly identified.

Figure 3:
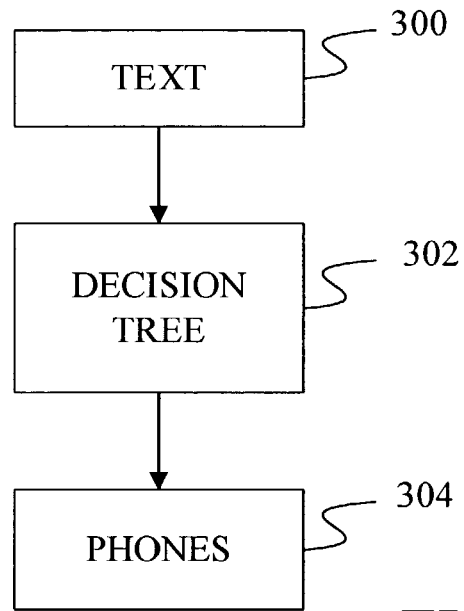
FIG. 3 is a block diagram of a pronunciation identification system that utilizes a decision tree formed using the present invention.

FIG. 3 provides a block diagram of a letter-to-sound system in which a decision tree having questions formed under the present invention is used to identify phonetic units for combinations of letters. In FIG. 3, a text 300 is applied to a decision tree 302. By answering the questions found in decision tree 302, a leaf node is identified in the tree that contains the phones 304 that are represented by text 300.

Figure 4:
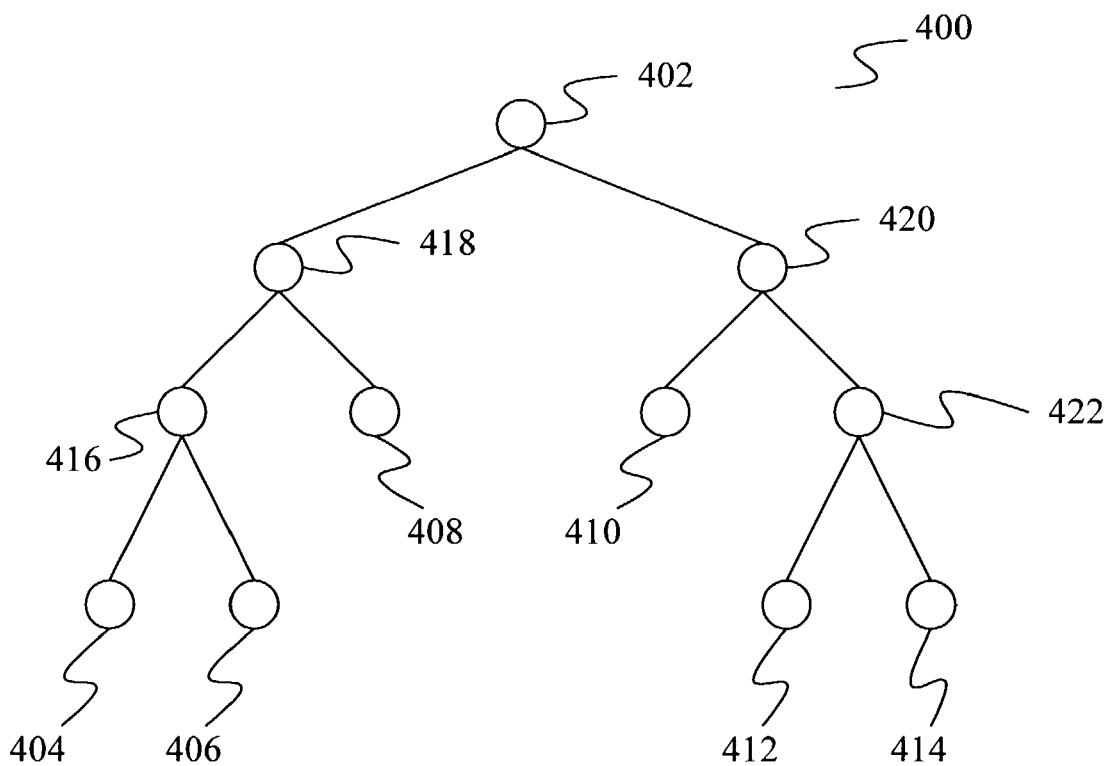
FIG. 4 is an example of a decision tree.

FIG. 4 shows an example of a decision tree 400 that includes questions formed using the method of the present invention. Decision tree 400 includes root node 402 and leaf nodes 404, 406, 408, 410, 412, and 414. Decision tree 400 also includes intermediate nodes 416, 418, 420, and 422. Root node 402 and intermediate nodes 416, 418, 420, and 422 each have an associated question, which determines the path that will be followed through the tree. For example, the question associated with root node 402 could be whether there is a vowel to the left of the center phone in the input triphone, if the tree is built with the purpose of clustering triphone states. If there is a vowel to the left, the path to node 418 is taken. However, if there is no vowel to the left, the path to node 420 is taken.

Figure 5:
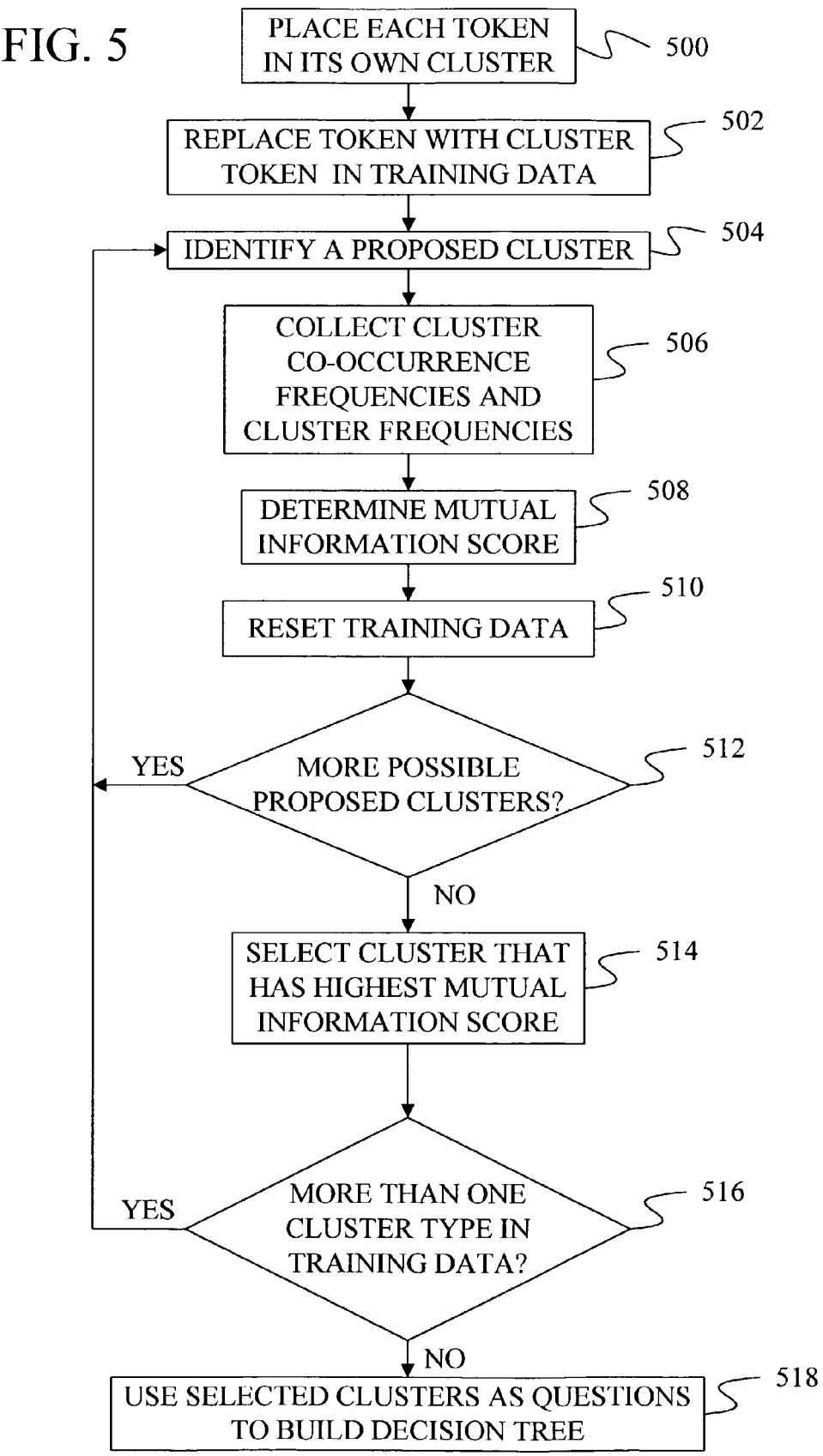
FIG. 5 is a flow diagram for forming a decision tree under the present invention.

FIG. 5 provides a flow diagram of a method of producing question sets to be used in a speech processing decision tree. The method can be used to form questions for clustering context-dependent phone structures or alternatively can be used to form questions for identifying pronunciations for combinations of letters. Under the method, the questions are defined as clusters of tokens. For the context-dependent phone questions, the tokens are phones. For the pronunciation questions, the tokens are letters.

Figure 6:
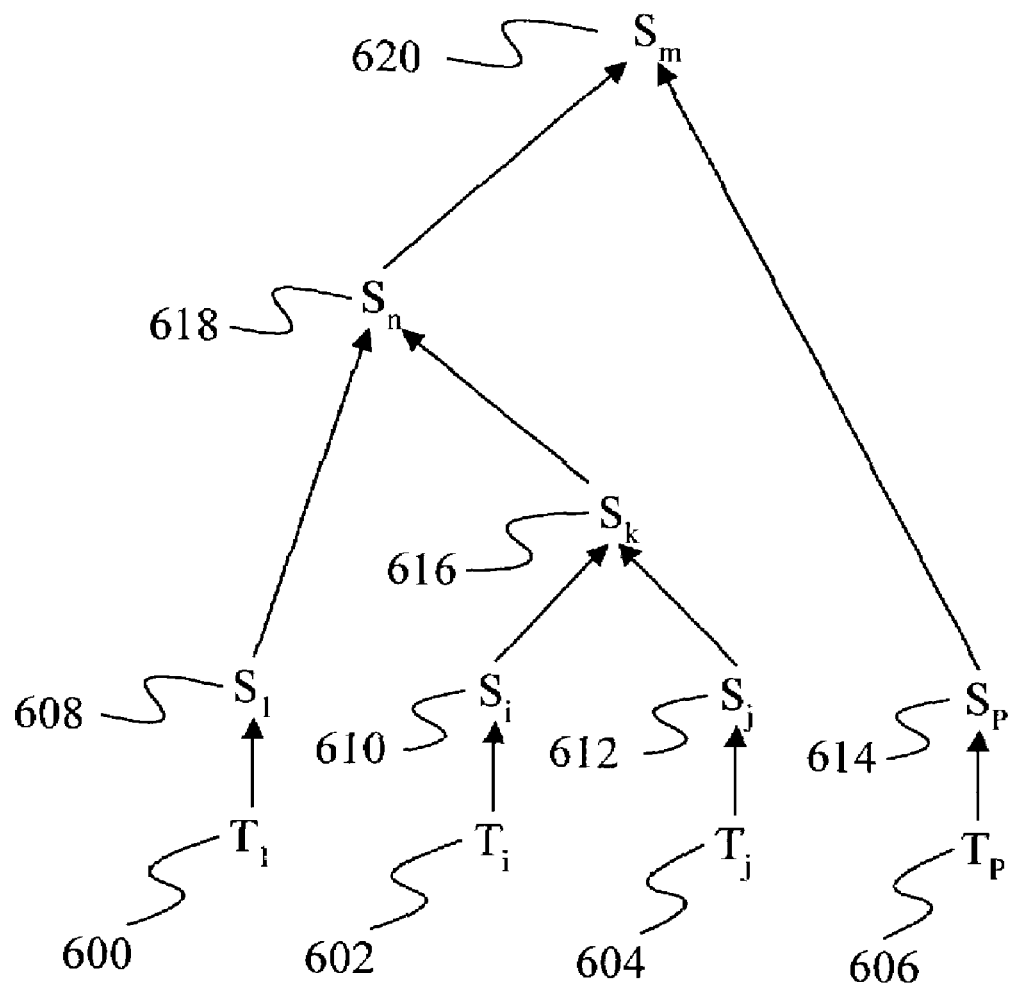
FIG. 6 is an example of token clustering under the present invention.

In step 500 of FIG. 5, a set of initial clusters are formed by placing each possible token in its own cluster. For the context-dependent phone questions, each monophone (context-independent phone) found in a language is placed in its own cluster. For the pronunciation questions, each letter of the alphabet is placed in its own cluster. This step is shown in FIG. 6, which shows an example of token clustering under the present invention. Thus, in FIG. 6, tokens such as 600, 602, 604, and 606 are placed in initial clusters such as clusters 608, 610, 612, and 614.

The method of the present invention then attempts to combine clusters to form new clusters. Under the method, the clusters are combined so as to minimize the loss of mutual information between adjacent clusters caused by the combination, where the mutual information is measured from training data using neighboring clusters. For the phone clusters, the training data consists of a phonetic translation of a text. For letter clusters, the training data consists of a training text segmented into individual letters.

Note that mutual information clustering is well known and has been used in other contexts before. However, it has not been used to form question sets for decision trees. Under one embodiment, the mutual information score is determined as:

$$MI = \sum_{i,j=1...n} f(S_i, S_j) \log \frac{f(S_i, S_j)}{f(S_i)f(S_j)} \qquad \text{EQ. 1}$$

where MI is the mutual information score, $S_i$ and $S_j$ are neighboring clusters in the training data that has n distinct clusters, $f(S_i,S_j)$ represents the number of times clusters $S_i$ and $S_j$ appear next to each other (also known as a co-occurrence) in the training data, and $f(S_i)$ and $f(S_j)$ represent the number of times clusters $S_i$ and $S_j$ appear individually in the training data. Thus, the summation of equation 1 is taken across all possible pairs of clusters.

At step 502, the tokens initially found in the training data are replaced with cluster tokens representing the clusters that the tokens were placed in at step 500. The method then loops through a series of steps that determine the change in mutual information that will occur for each possible merging of two existing clusters into a single new cluster.

Thus, at step 504 a possible new cluster is identified by combining two existing clusters. Each occurrence of a token for the two existing clusters in the training data is then replaced with a cluster token for the proposed new cluster. Cluster co-occurrence frequency counts and cluster frequency counts are then determined at step 506. A cluster co-occurrence frequency count indicates the number of times two cluster tokens appear next to each other in the training data. Using these frequency counts and equation 1 above, a mutual information score is determined at step 508.

The training data is then reset at step 510 by returning it to the state it was in before the cluster token for the proposed new cluster was used in place of the tokens for the two existing clusters.

At step 512, a determination is made as to whether there are any other pairs of clusters that could be combined to form a possible new cluster. If there are, the process returns to step 504 to identify another proposed cluster and steps 506, 508, and 510 are repeated for the new proposed cluster.

Steps 504, 506, 508, 510 and 512 are repeated until all possible combinations of pairs of clusters have been used to form a mutual information score. At step 514, these scores are compared to each other to determine which combination of clusters provides the highest mutual information score and thus the lowest drop in mutual information. The proposed new cluster that provides the highest mutual information score is then stored as a question set and the training data is permanently changed to replace each occurrence of the tokens of the two clusters that form the new cluster with a token representing the new cluster. Thus, in FIG. 6, if new cluster 616, which is formed by combining clusters 610 and 612, provides the highest mutual information score, each occurrence of a cluster token for cluster 610 in the training data would be replaced by a token representing cluster 616 and each occurrence of a cluster token for cluster 612 in the training data would be replaced by a token representing cluster 616.

As the method combines clusters, fewer and fewer different cluster tokens will be found in the training data. Eventually, only a single type of cluster token will be found in the training data and this cluster token will fill each token position within the data. This single cluster is shown as top cluster 620 in FIG. 6.

At step 516, the method determines if there is more than one type of cluster token remaining in the modified training data. If there is, the process returns to step 504 to test new possible combinations of clusters.

After all of the clusters have been combined into a single cluster at step 516, the clusters identified during the method of claim 5 are used to build a decision tree at step 518. In particular, each cluster can be used to construct a question in the decision tree by asking whether a token (a phone or a letter) in the input is found within a particular cluster. Thus, the set of clusters identified during the method of FIG. 5 (for example clusters 608, 610, 612, 614, 616, 618, and 620 of FIG. 6) represent a set of available questions for building the decision tree.

Techniques for building a decision tree from a set of available questions are well known in the art and include selecting a question from the set of available questions for a node in the tree so as to maximize some function such as a likelihood function.

Under one embodiment, a different tree is formed for each Hidden Markov Model (HMM) state of each phone in a language. Under such an embodiment, the decision tree is used to group or cluster triphone states into the leaf nodes of the tree. The triphone states in a leaf node are then used to form a model for the HMM state that can be used for any of the triphone states in the leaf node. A match between the model and an input feature vector would then indicate that one of the triphone states is represented by the input feature vector. Thus, the leaf nodes represent a cluster-based acoustic model.

In another embodiment, a separate tree is formed for each letter of the alphabet, and combinations of letters surrounding it—contexts—are grouped into the leaf nodes. A pronunciation for the letter in different contexts is then associated with each leaf node. When a letter in a new combination of letters—context—is received, its pronunciation is found by applying the combination to the corresponding decision tree to locate a leaf node and then retrieving the pronunciation for that letter associated with that leaf node.

By using mutual information, the present invention is able to identify a set of questions that can be used to build decision trees for speech processing without requiring a linguist to develop the question set. This represents a great cost and time savings over the prior art.

Although the present invention has been described with reference to particular embodiments, workers skilled in the art will recognize that changes may be made in form and detail without departing from the spirit and scope of the invention.

What is claimed is:

1. A computer-readable storage medium encoded with computer-executable instructions for causing a computer to perform steps comprising:

forming a separate cluster of tokens for each possible token that can appear in training data;

determining whether to combine a first cluster of tokens and a second cluster of tokens to form a new cluster of tokens using mutual information wherein the mutual information is based on the number of times tokens from the new cluster of tokens appear next to tokens from another cluster of tokens in the training data;

building a decision tree by utilizing at least one of the clusters of tokens to form a question for a node in the decision tree, the question asking whether a token in an input is found within the at least one cluster; and using the decision tree to identify a leaf node of the tree based on an input.

2. The computer-readable storage medium of claim 1 wherein a cluster of tokens comprises a cluster of phones.

3. The computer-readable storage medium of claim 2 wherein using the decision tree to identify a leaf node based on an input comprises identifying a leaf node for a context-dependent phone.

4. The computer-readable storage medium of claim 3 wherein the context-dependent phone comprises a triphone.

5. The computer-readable storage medium of claim 1 wherein a cluster of tokens comprises a cluster of letters.

6. The computer-readable storage medium of claim 5 wherein using the decision tree to identify a leaf node comprises using the decision tree to identify a pronunciation for an input comprising a combination of letters.

7. The computer-readable storage medium of claim 1 where determining whether to combine a first cluster of tokens and a second cluster of tokens to form a new cluster of tokens using mutual information comprises:

identifying the first new cluster and a second possible new cluster;

determining a mutual information score for the training data using the first new cluster;

determining a mutual information score for the training data using the second possible new cluster; and selecting between the first new cluster and the second possible new cluster based on the mutual information scores for the first new cluster and the second possible new cluster.

8. A method of forming a decision tree used in speech processing, the method comprising:

grouping at least two tokens to form a first possible cluster;

a processing unit determining a mutual information score based on the first possible cluster through steps comprising determining the number of times tokens from the first possible cluster appear next to tokens from a second cluster, the number of times tokens from the first possible cluster appear individually, and the number of times tokens from the second cluster appear individually;

grouping at least two tokens to form a third possible cluster;

the processing unit determining a mutual information score based on the third possible cluster through steps comprising determining the number of times tokens from the third possible cluster appear next to tokens from a fourth cluster, the number of times tokens from the third possible cluster appear individually, and the number of times tokens from the fourth cluster appear individually;

the processing unit selecting one of the first cluster and the third cluster based on the mutual information scores associated with the first cluster and the third cluster;

using the selected cluster to form a question in the decision tree used in speech processing; and storing the decision tree on a computer-readable storage medium for later use in speech processing.

9. The method of claim 8 wherein each token is a linguistic phone.

10. The method of claim 9 wherein the decision tree defines clusters of context-dependent phones.

11. The method of claim 10 wherein the context-dependent phones are triphones.

12. The method of claim 8 wherein each token is a letter in an alphabet.

13. The method of claim 8 wherein selecting one of the first cluster and the third cluster comprises selecting the cluster that provides a higher mutual information score.

14. The method of claim 8 wherein determining a mutual information score based on the first possible cluster comprises:

placing a cluster token representing the first possible cluster in place of each of the at least two tokens in a set of training data to form a modified set of training data; and determining the mutual information score of the modified set of training data.

15. A method of forming a decision tree for speech processing, the method comprising:

identifying at least two possible clusters of tokens in a set of training data;

a processing unit using co-occurrence frequency counts of clusters to select one of the at least two possible clusters wherein the co-occurrence frequency counts comprise the number of times tokens from two clusters appear next to each other in the training data;

the processing unit storing the selected cluster on a computer-readable storage medium as a question for a node in the decision tree for speech processing wherein the question asks whether an input token is found in the selected cluster.

16. The method of claim 15 wherein each token is a letter.

17. The method of claim 15 wherein using co-occurrence frequency counts comprises determining a mutual information score.

18. The method of claim 15 wherein each token is a phone.

19. The method of claim 18 wherein the decision tree defines groupings for context-dependent phones.

* * * * *